(12) United States Patent
Green

(10) Patent No.: US 8,888,171 B2
(45) Date of Patent: Nov. 18, 2014

(54) SELECTIVELY DETACHABLE FENDER BRACE SYSTEM

(71) Applicant: GM Global Technology Operations LLC, Detroit, MI (US)

(72) Inventor: Michael J. Green, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/962,484

(22) Filed: Aug. 8, 2013

(65) Prior Publication Data

US 2014/0062131 A1 Mar. 6, 2014

Related U.S. Application Data

(60) Provisional application No. 61/697,755, filed on Sep. 6, 2012.

(51) Int. Cl.

| | |
|---|---|
| *B60N 3/00* | (2006.01) |
| *B62D 25/16* | (2006.01) |
| *B62D 25/08* | (2006.01) |
| *B62D 21/15* | (2006.01) |
| *B62D 27/06* | (2006.01) |
| *B62D 65/02* | (2006.01) |
| *B62D 25/02* | (2006.01) |

(52) U.S. Cl.
CPC .............. *B62D 27/06* (2013.01); *B62D 25/163* (2013.01); *B62D 25/085* (2013.01); *B62D 21/155* (2013.01); *B62D 65/02* (2013.01); *B62D 25/02* (2013.01)

USPC ........................................................ 296/198

(58) Field of Classification Search
CPC .. B62D 25/163; B62D 25/085; B62D 21/155; B62D 27/06; B62D 65/02; B62D 25/02
USPC .................. 296/29, 187.12, 191, 193.05, 198
See application file for complete search history.

(56) References Cited

U.S. PATENT DOCUMENTS

| | | | | |
|---|---|---|---|---|
| 6,824,199 | B2 * | 11/2004 | Weik et al. ................ | 296/187.04 |
| 8,182,027 | B2 * | 5/2012 | Steinhilb et al. .............. | 296/198 |
| 2005/0242625 | A1 * | 11/2005 | Hafner et al. ............ | 296/193.05 |
| 2011/0109124 | A1 * | 5/2011 | Ito et al. ........................ | 296/198 |

* cited by examiner

*Primary Examiner* — Lori Lyjak
(74) *Attorney, Agent, or Firm* — Cantor Colburn LLP

(57) ABSTRACT

A selectively detachable fender brace system includes a structural fender assembly comprising an outer fender panel comprising an outer upper attachment flange having a brace bore disposed therein and an inner fender panel comprising an inner upper attachment flange having a first blind slot extending inwardly toward an engine compartment and rearwardly to a first slot opening, the inner fender panel attached to the outer fender panel with the inner upper attachment flange disposed below the outer upper attachment flange and brace bore proximate the first blind slot; a brace comprising a fender end having a fender bore extending therethrough and an opposed wall end that is detachably attached to a cross-vehicle wall of the engine compartment; and a threaded fastener that is disposed through the brace bore, first blind slot and fender bore configured to apply a predetermined clamping force and forming a selectively detachable fender attachment joint.

20 Claims, 12 Drawing Sheets

SELECTIVELY DETACHABLE FENDER BRACE SYSTEM

CROSS-REFERENCES TO RELATED APPLICATIONS

This patent application claims priority to U.S. Provisional Patent Application Ser. No. 61/697,755, filed Sep. 6, 2012, which is incorporated herein by reference in its entirety.

FIELD OF THE INVENTION

The subject invention relates to vehicles, more particularly to a fender brace system for a vehicle, and even more particularly to a fender brace system for a vehicle front fender, including a structural front fender having a multi-gage inner fender panel.

BACKGROUND

Vehicles, such as automobiles, are assembled by aligning and fastening numerous components and subassemblies to one another. One region of the automobile requiring assembly of such components and subassemblies is a front end region. This portion of the vehicle is frequently assembled as an assembly or subassembly referred to as a "front clip." The front clip is commonly defined as the assembly comprising the portion of the vehicle extending from the A-pillar (the roof support pillar associated with the front windscreen) to the most forwardly disposed component, typically a front bumper. The front clip includes a structural frame, as well as a variety of vehicle components that collectively form the vehicle body.

Several efforts to directly or indirectly mount and/or fix the vehicle body components to each other, as well as to the vehicle frame, have relied on welded support structures or frames and machined body mounting locations for the body components. Front end clips that use welded frames to attach front clip components are effective, but they generally require very large capital investments to support automated, high volume mass production. Frameless approaches for assembly of the front end clip are very desirable because they have greatly reduced capital requirements, but have sometimes been subject to undesirably large variations in alignment and fastening of components to one other. These large variations may influence the aesthetic appearance of the automobile to a user by providing non-uniform or undesirably large or small gaps and spacings between components and may be the cause of functional deficiencies, such as undesirable large opening/closing efforts, alignment and mutilation of components due to misalignment and interference, and non-uniform gaps and spacings, which each may affect consumer satisfaction.

Frameless front clip assembly requires the use of structural fenders as compared to frame-based front end clip construction where the fender sheet metal may be attached directly to the frame and the frame provides much of the needed structural strength. One area of concern in frameless front clip assemblies that use structural fenders, such as the front end sheet metal of the floating structure of a full size truck, has been the development of structural fenders and methods of making and using them so as to set the structural fender in an optimal position to ensure predetermined requirements. These requirements include aesthetic requirements, such as gap, spacing, class A finish and other aesthetic requirements, as well as structural function requirements, such as strength and modal frequency response, and overall vehicle requirements, such as, for example, selectively controllable frontal impact response. For example, it is frequently desirable to increase the strength and stiffness of the structural front fenders to improve vehicle ride and handling. However, while increased strength and stiffness improves ride and handling under normal operating conditions, these characteristics may over constrain the structural fender during a frontal impact, where it is desirable that the structural fender have a selectively controllable deformation characteristic to provide a predetermined energy absorption of the impact energy.

Accordingly, it is desirable to provide structural fenders that meet the structural requirements for strength and stiffness and that also provide a selectively controllable deformation characteristic.

SUMMARY OF THE INVENTION

In one exemplary embodiment of the invention, a selectively detachable fender brace system is disclosed. The system includes a structural fender assembly comprising an inner fender panel and an outer fender panel comprising an outer surface that is a viewable surface of a vehicle, the outer fender panel having an outer upper attachment flange, the outer upper attachment flange having a brace bore disposed therein, the inner fender panel having an inner upper attachment flange, the inner upper attachment flange having a first blind slot, the first blind slot extending rearwardly to a first slot opening, the inner fender panel attached to the outer fender panel with the inner upper attachment flange disposed below the outer upper attachment flange and the brace bore disposed proximate the first blind slot. The system also includes a brace comprising a fender end having a fender bore extending therethrough and an opposed wall end that is detachably attached to a cross-vehicle wall of the engine compartment. The system further includes a fastener that is disposed through the brace bore, first blind slot and fender bore and configured to apply a predetermined clamping force to them forming a selectively detachable fender attachment joint.

In another exemplary embodiment of the invention, a vehicle comprising a selectively detachable fender brace system is disclosed. The vehicle includes a structural fender assembly comprising an inner fender panel and an outer fender panel comprising an outer surface that is a viewable surface of the vehicle, the outer fender panel having an outer upper attachment flange, the outer upper attachment flange having a brace bore disposed therein, the inner fender panel having an inner upper attachment flange, the inner upper attachment flange having a first blind slot, the first blind slot extending rearwardly to a first slot opening, the inner fender panel attached to the outer fender panel with the inner upper attachment flange disposed below the outer upper attachment flange and the brace disposed proximate the first blind slot; a brace comprising a fender end having a fender bore extending therethrough and an opposed wall end that is detachably attached to a cross-vehicle wall of the engine compartment and a fastener that is disposed through the brace bore, first blind brace slot and fender bore and configured to apply a predetermined clamping force to them forming a selectively detachable fender attachment joint. The vehicle also includes a second structural fender assembly disposed opposite the engine compartment from the first fender assembly, the second structural fender assembly comprising a second inner fender panel and a second outer fender panel comprising a second outer surface that is a second viewable surface of the vehicle, the second outer fender panel having a second outer upper attachment flange, the second outer upper attachment flange having a second brace bore disposed therein, the second inner fender panel having a second inner upper attachment flange, the second inner upper attachment flange having a second blind slot, the second blind slot extending rearwardly to a second slot opening, the second inner fender panel attached to the second outer fender panel with the second inner upper attachment flange disposed below the second outer upper attachment flange and the second brace bore disposed proximate the second blind slot; a second brace comprising a second fender end having a second fender bore extending therethrough and an opposed second wall end that is detachably attached to the cross-vehicle wall of the engine compartment; and a second fastener that is disposed through the second brace bore, second blind slot and second fender bore and configured to apply a predetermined second clamping force to them forming a selectively detachable second fender attachment joint.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
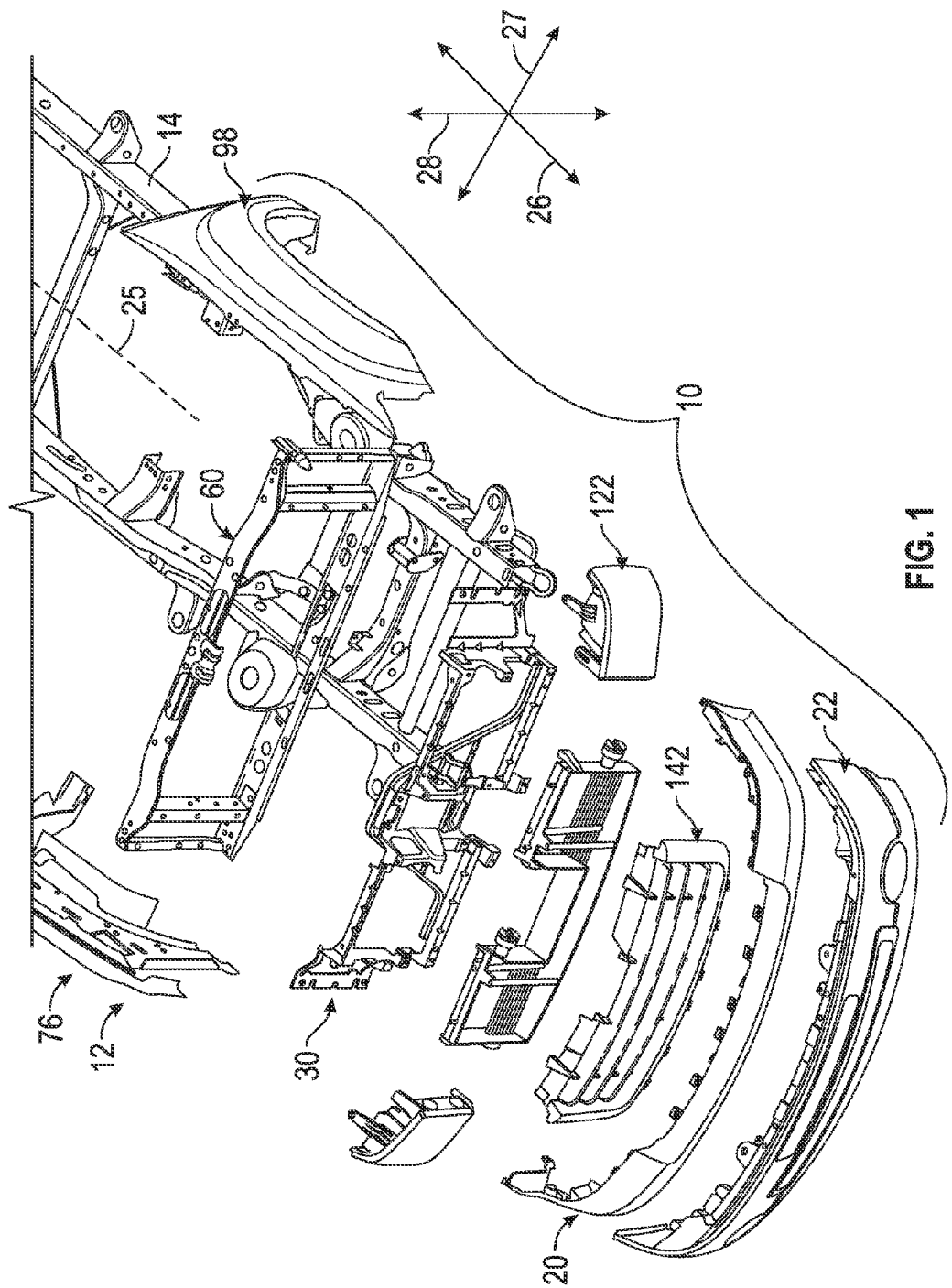
FIG. 1 is a simplified, partially disassembled perspective view of a front end assembly of a vehicle.

The following description is merely exemplary in nature and is not intended to limit the present disclosure, its application or uses. It should be understood that throughout the drawings, corresponding reference numerals indicate like or corresponding parts and features. In accordance with an exemplary embodiment a structural fender brace system is provided that improves the strength and stiffness of a vehicle front end, including the fender assemblies, and vehicle ride and handling, and yet does not impair the fender assemblies from collapsing in a vehicle frontal impact event. The brace system includes a selectively detachable, tear-away joint that is selectively detachable in response to the forces generated in a vehicle frontal impact event. The selectively detachable joint provides strength and stiffness during normal vehicle operation, but allows a directionally controlled tear away joint for extreme events, such as a frontal impact event. The controlled detachment and tear-out of the joint also controls the deformation of the fender assembly enabling it to deform outwardly away from the engine compartment, with the controlled deformation of the fender assembly providing very desirable absorption and dissipation of the energy associated with the impact event. The fender brace system may also be used in conjunction with a unique fender assembly comprising a fender inner panel that includes gage optimized, multiple thickness, laser-welded, sheet metal blanks. Using laser-welded blanks to form the fender inner fender panel provides mass and cost reduction for the automotive vehicle while maintaining efficiency of material utilization and structural performance. The fender inner fender panel may also be attached to a fender outer panel to form a structural fender, or as it may also be termed a structural fender assembly, for the vehicle as described herein.

Referring to FIGS. 1-9, and particularly to FIGS. 1-4, in accordance with an exemplary embodiment of the invention, a partially disassembled view of a front end assembly 10 of a vehicle 12 is shown in the form of an automobile. Although the vehicle 12 is illustrated as an automobile, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. The preceding list is merely illustrative and is not intended to be limiting of the numerous automobile types that may benefit from the embodiments of the invention.

The vehicle 12 includes a frame 14 formed of several integrally formed or operably coupled components to provide a structural support configured to directly or indirectly support components and subassemblies for the vehicle 12. Supported components and subassemblies include a plurality of body components and the vehicle 12 is typically referred to as having a body-on-frame construction, based on the direct or indirect mounting and fixing of the various components to the frame 14. The front end assembly 10 is the region of the vehicle 12 that is defined by a portion of the vehicle 12 extending forward from what is known conventionally as an "A-pillar" to a forwardmost component, such as a front bumper 20. The front end assembly 10 may be interchangeably referred to as a "front clip" of the vehicle 12.

To facilitate assembly of the front end assembly 10, both with respect to components in relation to each other as well as to the frame 14, a positioning and reinforcement structure 30 is included. The positioning and reinforcement structure 30 generally refers to a structure configured to provide a foundation for inter-part dimensional relationships during the assembly process for all components of the front end assembly 10, thereby alleviating reliance on individual machined mounting locations. In one embodiment, the positioning and reinforcement structure 30 comprises a grill opening reinforcement (GOR) structure that acts to define and reinforce a grill opening. Since the positioning and reinforcement structure 30 may be formed as an assembly, it may also be referred to herein as a positioning and reinforcement structure 30 or a GOR assembly. As will be described in detail below, the positioning and reinforcement structure 30 includes locators, fastening features, and other critical dimensional relationship interfaces of several components and subassemblies. Such components and subassemblies typically include structural fenders or fender assemblies 76, 98, headlamps 122, grills 142, fascias 22, bumpers 20 and bumper attachment features, hoods 118, hood latches (not shown), hood bumpers 18 and under-hood closeout panels (not shown), air baffles (not shown) and radiator supports 60, for example. It is to be understood that the preceding list is merely illustrative of the numerous components and subassemblies which may be included in the front end assembly 10 and may benefit from the positioning and reinforcement structure 30. Exemplary components and subassemblies will be described in detail below. As used herein, an axial direction 26 refers to a direction that extends frontward and rearward along a central axis 25 of the vehicle, a cross-vehicle direction 27 refers to a direction that extends laterally or across the vehicle and a vertical direction 28 refers to a direction that extends upwardly and downwardly. In one embodiment, these directions are mutually orthogonal with regard to one another.

Figure 2:
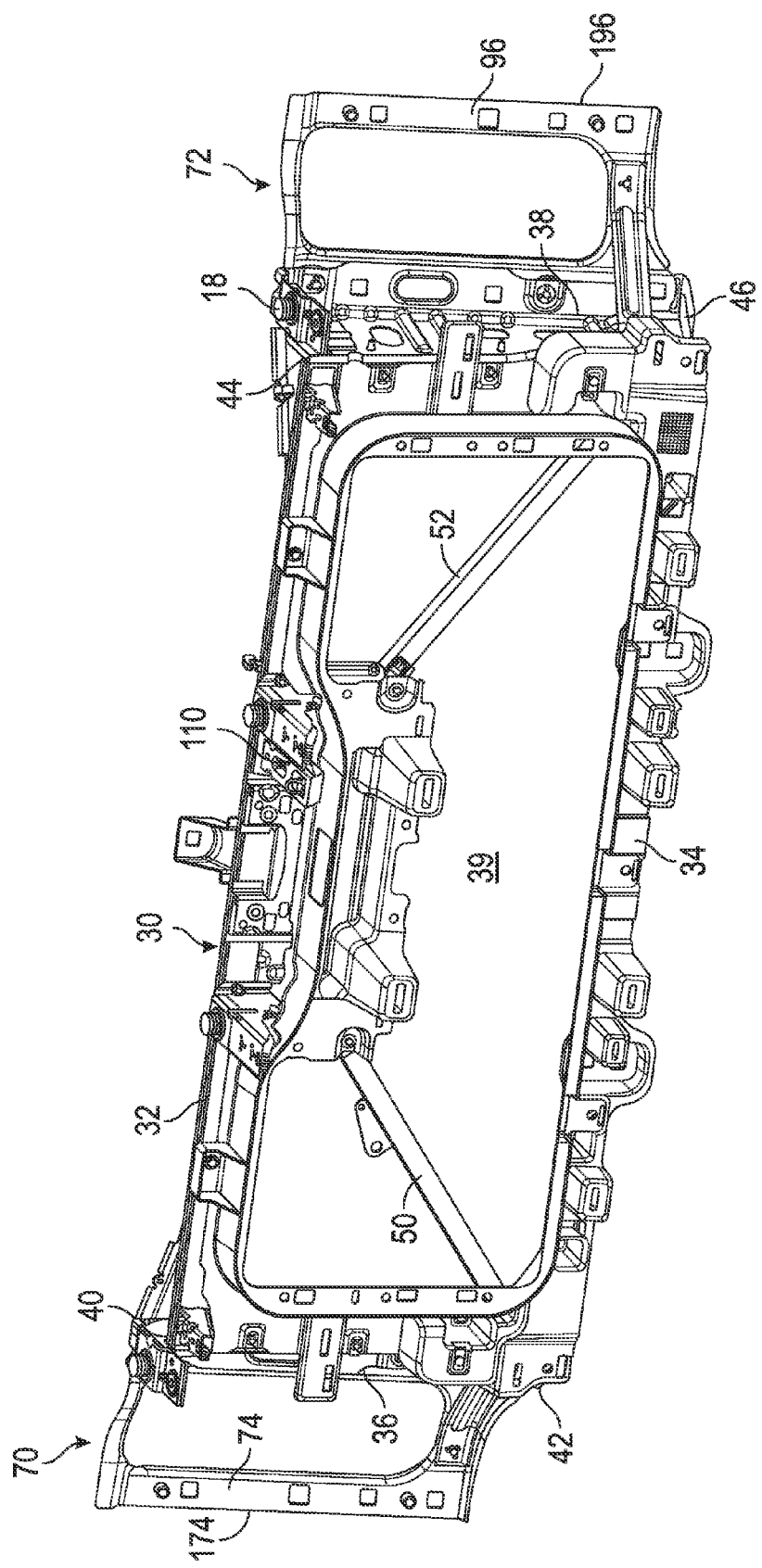
FIG. 2 is a perspective view of a positioning and reinforcement structure of the front end assembly.

Referring now to FIGS. 1 and 2, and particularly FIG. 2, the positioning and reinforcement structure 30 is illustrated in greater detail. The positioning and reinforcement structure 30 includes a rectilinearly situated geometry defined by a top support member 32, a bottom support member 34, a first side member 36 and a second side member 38. The top support member 32 and the bottom support member 34 each extend relatively horizontally in a cross-vehicle direction 27 and relatively parallel to each other. The first side member 36 and the second side member 38 extend relatively parallel to each other, but in a relatively vertical 28 direction. As may be understood, the positioning and reinforcement structure 30 is therefore a substantially cross-vehicle extending and vertically extending structure or frame. The first side member 36 is coupled proximate a first side member top region 40 to the top support member 32 and to the bottom support member 34 proximate a first side member bottom region 42. Likewise, the second side member 38 is coupled proximate a second side member top region 44 to the top support member 32 and to the bottom support member 34 proximate a second side member bottom region 46. The coupling between the top support member 32, the bottom support member 34, the first side member 36 and the second side member 38 may be in the form of an integral formation process so as to form an integral positioning and reinforcement structure 30, such as by casting, laser welding or spot welding, for example. Alternatively, an operable coupling may facilitate the formation of the positioning and reinforcement structure 30 as an assembly, such as by mechanical fasteners, for example. Alternatively, an operable coupling may facilitate the formation of the positioning and reinforcement structure 30 as an assembly, such as by mechanical fasteners, for example. The preceding examples of the precise connections between the top support member 32, the bottom support member 34, the first side member 36 and the second side member 38 are merely illustrative and numerous alternative coupling configurations are contemplated. Irrespective of the precise attachment, the top support member 32, the bottom support member 34, the first side member 36 and the second side member 38 form a central portion 39 of the positioning and reinforcement structure 30.

Furthermore, the above-described components associated with the positioning and reinforcement structure 30, as well as those described below, may comprise various materials, such as plastic or a metal. Additionally, the components may be formed as an over-mold having more than one material forming one or more of the components. Such materials may include magnesium, aluminum, and composites, for example, however, many alternative materials are contemplated. The positioning and reinforcement structure 30, or GOR structure, may have any suitable size and shape, and may be used, for example, to define and reinforce a grill opening having any suitable size and shape.

The positioning and reinforcement structure 30 also includes a first brace 50 extending in a relatively diagonal manner from proximate the first side member bottom region 42 to a relatively central location along the top support member 32, to which the first brace 50 is operably coupled. The first brace 50 may be coupled to the first side member 36 or the bottom support member 34, or both. Similarly, a second brace 52 is included and extends in a relatively diagonal manner from proximate the second side member bottom region 46 to the top support member 32, to which the second brace 52 is attached. The second brace 52 may be coupled to the second side member 38 or the bottom support member 34, or both. The first brace 50 and the second brace 52 may be operably coupled to the top support member 32 in a relatively coaxial manner, such that the first brace 50 and the second brace 52 mount to a single location of the top support member 32. The first brace 50 and the second brace 52, both singularly and in combination, provide structural support for the overall positioning and reinforcement structure 30. Additionally, the first brace 50 and/or the second brace 52 include mounting and locating features corresponding to components integrated with, or associated with, the positioning and reinforcement structure 30.

Referring again to FIG. 2, the positioning and reinforcement structure 30 includes a first wing structure 70 and a second wing structure 72, with the first wing structure 70 being detachably coupled to the first side member 36, while the second wing structure 72 is detachably coupled to the second side member 38. The first wing structure 70 includes a first side flange 74 proximate an outermost location of the first wing structure 70 for fixing the positioning and reinforcement structure 30 to a first fender assembly 76. The second wing structure 72 includes a second side flange 96 proximate an outermost location of the second wing structure 72 for fixing the positioning and reinforcement structure 30 to a second fender assembly 98.

Figure 3:
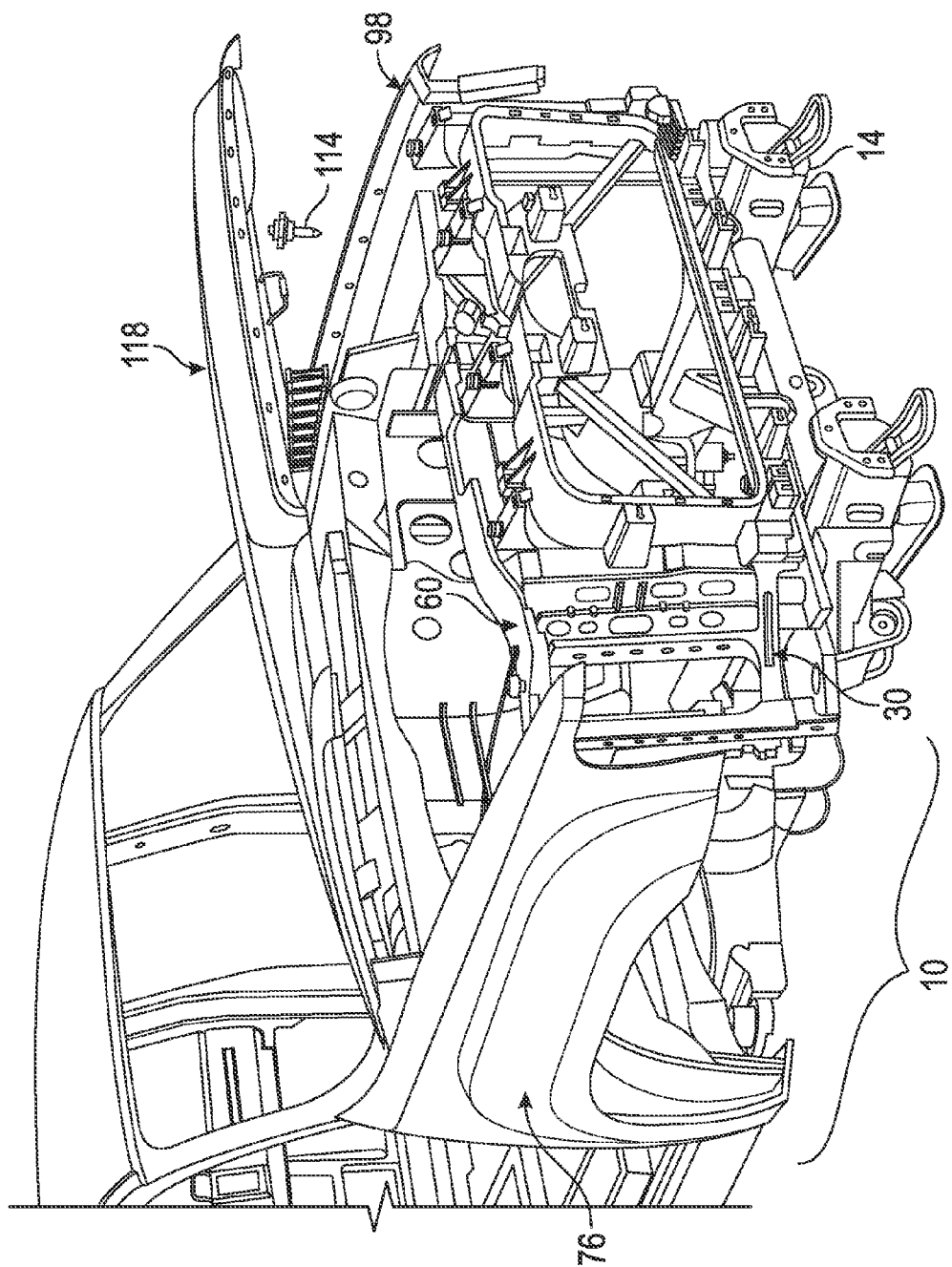
FIG. 3 is a perspective view of a hood disposed proximate the positioning and reinforcement structure and fenders.
Figure 4:
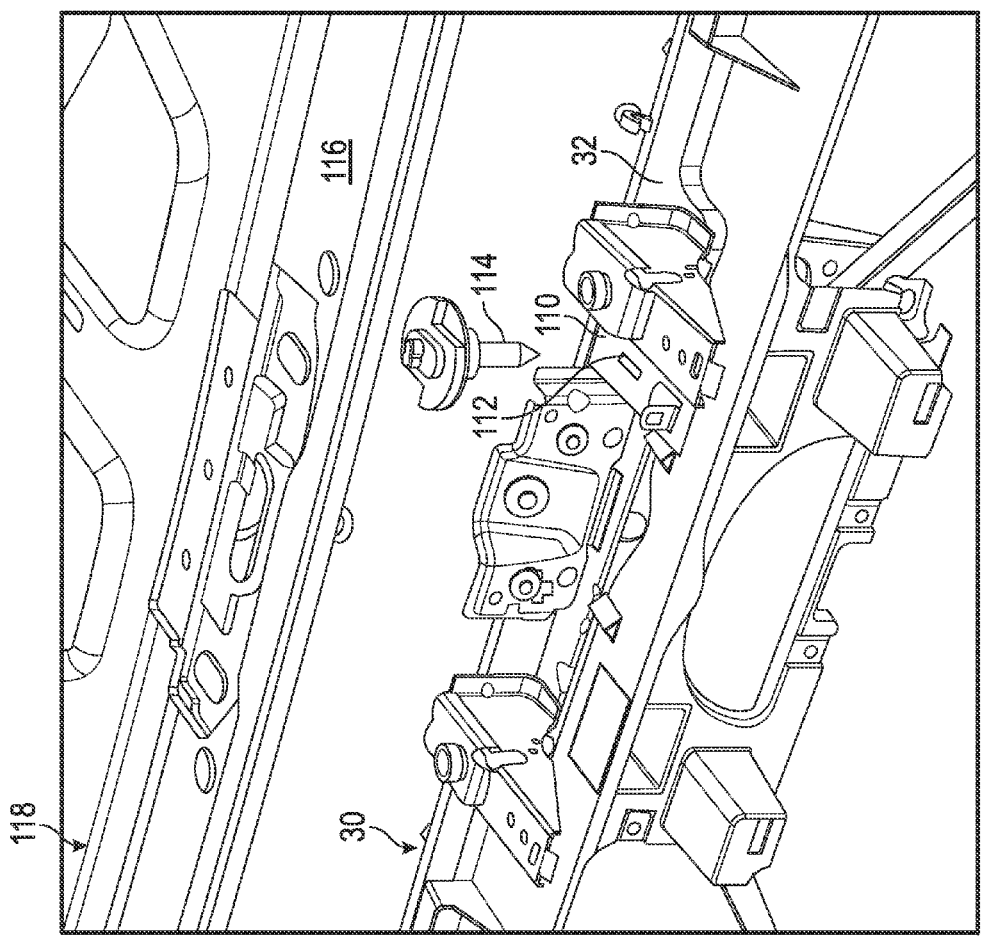
FIG. 4 is a perspective view of the hood prior to locating the hood relative to the positioning and reinforcement structure and fenders.
Figure 5:
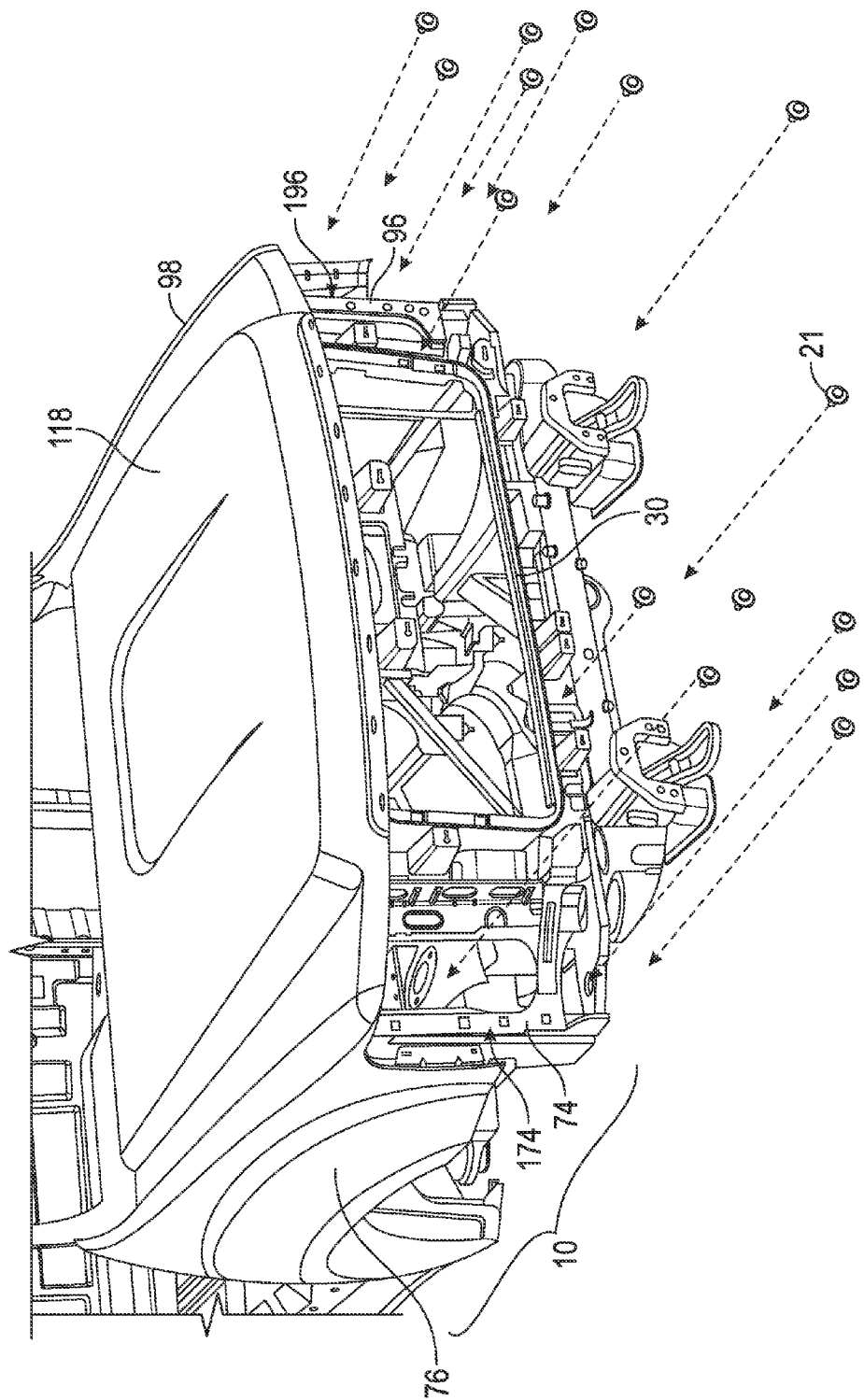
FIG. 5 is a perspective view of a hood disposed proximate the positioning and reinforcement structure and fenders, wherein the position of the fenders has been established by the positioning and reinforcement structure which is being fixedly secured to the radiator support upon closure of the hood and centering of the structure and hood relative thereto.

Referring to FIGS. 3-5, as indicated, the positioning and reinforcement structure 30 is used to establish predetermined visual modalities by the positioning and attachment of one or more components of the front end assembly 10, and preferably a plurality of the components of the front end assembly 10, particularly those components that are directly visible or viewable, or those components that are not directly visible, but whose position directly or indirectly effects the position of components that are directly visible. The predetermined visual modalities may include positioning various components with various predetermined gaps and spacings, including three-dimensional gaps and spacings, and particularly uniform gaps and spacings, such as by positioning the structural fender assemblies 76, 98 with regard to the front hood 118.

Referring again to FIGS. 3-5, in one embodiment, this includes providing a modality for establishing a predetermined position for the structural fender assemblies 76, 98, including an optimal position as described herein, wherein the fender assemblies 76, 98 are each spaced from the front hood 118 with uniform gaps and spacings, and preferably the same uniform gaps and spacings. The positioning and reinforcement structure 30 may be used to set the position of the fender assemblies 76, 98 relative to the hood 118 upon closure of the hood. In one embodiment, for example, the positioning and reinforcement structure 30 may include a centering bracket 110 disposed proximate a top side of the top support member 32. The centering bracket 110 is configured to locate a front region of the hood 118 to the positioning and reinforcement structure 30 by a locating pin 114 disposed in a predetermined location on the front portion of the hood 118 that is configured to engage a centering feature, such as a bore or slot 112 in the centering bracket 110 and thereby position, such as by centering, the positioning and reinforcement structure 30 and the fender assemblies 76, 98, which are attached, respectively, to the first side flange 74 and second side flange 96 of the structure upon positioning of the GOR structure 30 and fender assemblies 76, 98 relative to the hood 118 by the closure of the hood 118. The GOR structure 30 may be fixed to a radiator support 60 (FIG. 3) using any suitable fasteners such as a plurality of threaded fasteners. Further explanation of the positioning of fender assemblies 76, 98 using the positioning and reinforcement structure 30 is provided in U.S. Provisional Patent Applications 61/695,667, filed on Aug. 31, 2012, and 61/695,695, filed on Aug. 31, 2012, which are assigned to the same assignee as this application, and which are hereby incorporated by reference herein in their entirety.

Referring to FIGS. 6-9, an inner fender panel 200 for a structural fender assembly 76, 98 of an automotive vehicle 12 includes an outer surface 210 configured for attachment to the inner surface 320 of an outer fender panel 300 of the fender assembly, and an inner surface 220. The inner fender panel 200 may be any suitable inner fender panel 200, including a one-piece, single gage inner fender panel 200. In one embodiment, the inner fender panel 200 comprises a multi-gage inner fender panel comprising a plurality of abutting inner fender panel sections 230, FIG. 6, that are distinguished herein using a tenths digit 230.1, 230.2, 230.3, etc. that are permanently joined to one another. Any number of inner fender panel sections may be used, including 2, 3, 4, 5, etc. sections. Each of the inner panel sections, including a panel comprising a single section, may include formed ribs 232, pockets 233, corners 234, flanges 235 or tabs 236 and other formed features or structures that may be used to increase the stiffness of the panel, or provide a clearance or accommodate another front end component that is nested within, or positioned by, or attached to the inner fender panel section 230, or a combination thereof. The inner fender panel 200 may also include various cutouts 237, holes or bores 238, slots 239 or other openings used to lower the mass of the panel, or provide an opening needed for another component (e.g., an air box or air conduit), or to receive a fastener or a locating member.

Each inner fender panel section 230 has a thickness, and the multi-gage inner fender panels disclosed herein are characterized by having at least two abutting inner fender panel sections 230 having thicknesses that are different. In one embodiment, only two abutting inner fender panel sections have different thicknesses. In other embodiments, more than two panels have thicknesses that are different. In one embodiment, all of the inner fender panel sections 230 have different thicknesses.

In one embodiment, the outer surface 210 of the inner fender panel 200 that engages the inner surface 320 of the outer fender panel 300 is substantially planar. That is, even though the inner fender panel 200 includes a plurality of inner fender panel sections 230, and outer surface 210 is a surface of complex curvature, the surface forms a continuous plane, and particularly does not have stepwise discontinuities at the interfaces between abutting inner fender panel sections, including those having different thicknesses. Stated differently, the outer surfaces 210 of abutting inner fender panel sections 230 having thicknesses that are different are substantially co-planar. In one embodiment, the thickness of the inner fender panel sections may range from about 0.75 mm to about 2.5 mm, and more particularly may range from about 0.8 mm to about 1.5 mm. These ranges may include the thicknesses of the formed inner panel sections that may include up to about 16% plastic strain (deformation), including a reduction in thickness from the flat planar inner fender panel blanks from which the formed inner panel sections are made of up to about 16%.

The inner fender panel 200 may be made from any suitable material. In one embodiment, each of the plurality of abutting inner fender panel sections 230 includes a metal sheet material having a suitable material composition. Any formable metal sheet material and material composition that meets the structural and performance requirements of the vehicle, particularly the vehicle fender, may be used. Suitable material compositions of the metal sheet material include various steel alloys or aluminum alloys. Other lightweight, high strength sheet materials may also be used as the metal sheet, including various magnesium alloys and titanium alloys. In one embodiment, the metal sheet material of each of the plurality of abutting inner fender panel sections 230 may have the same material composition. In another embodiment, the metal sheet material of the plurality of abutting inner fender panel sections 230 may have different material compositions.

The abutting inner fender panel sections 230 may be joined to one another by any suitable joint or joining method. In one embodiment, the abutting panel sections are joined to one another by laser welding to form laser weld joints 240, FIG. 6, between them. The laser weld joints 240 may be configured to extend in a substantially vertical direction 28 or a substantially axial direction 26, or a combination thereof, when the inner fender panel 200 is installed on an automotive vehicle 12. In one embodiment, the laser weld joints 240 may be selected so that they all extend in the same direction (e.g., vertically or axially).

Figure 6:
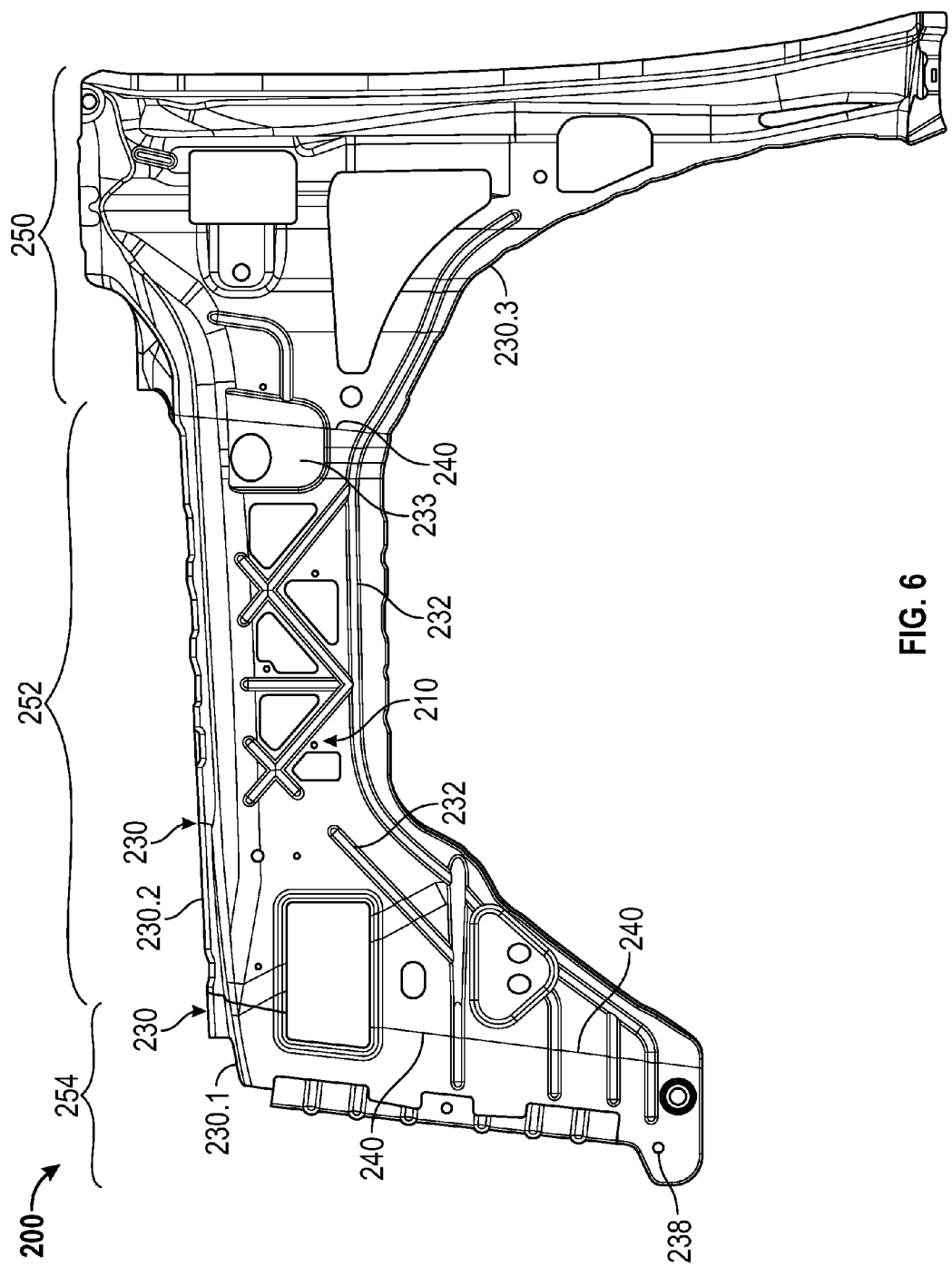
FIG. 6 is a side view of an embodiment of a multi-gage inner fender panel as disclosed herein.
Figure 7:
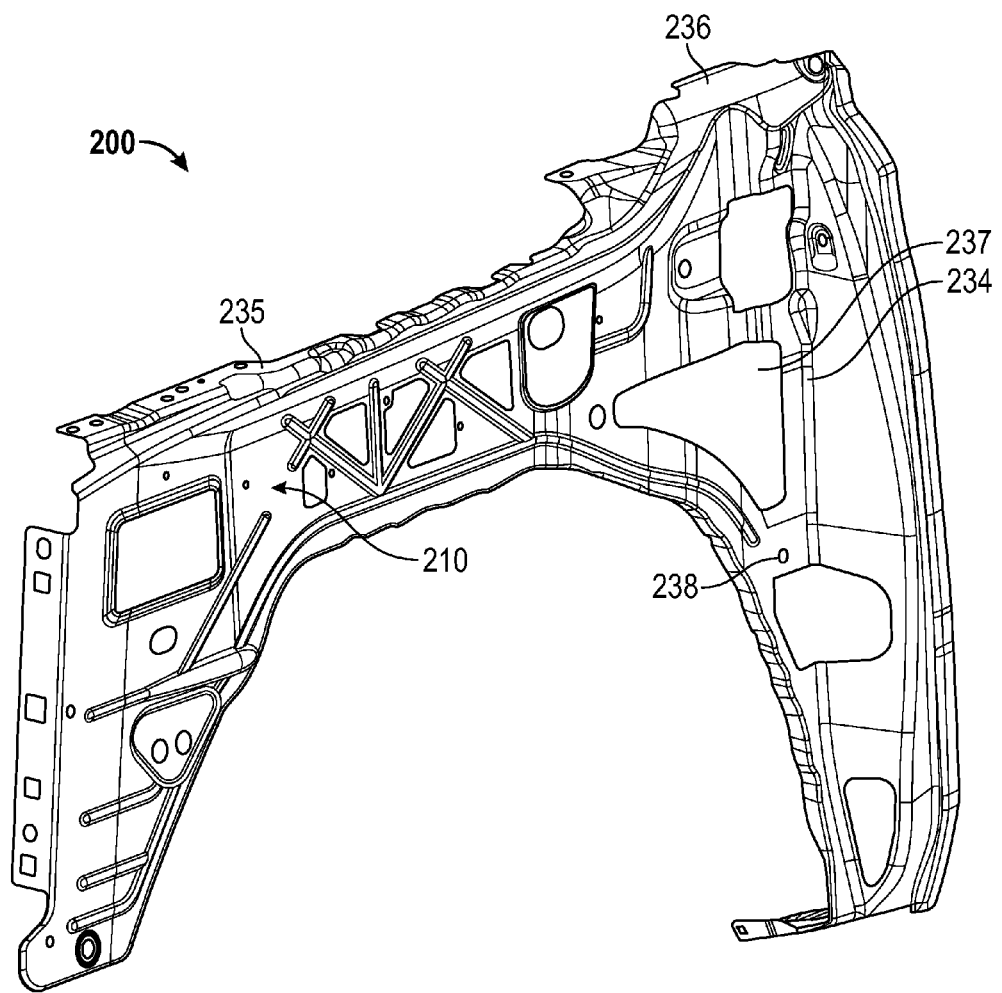
FIG. 7 is a front perspective view of the inner fender panel of FIG. 6.
Figure 8:
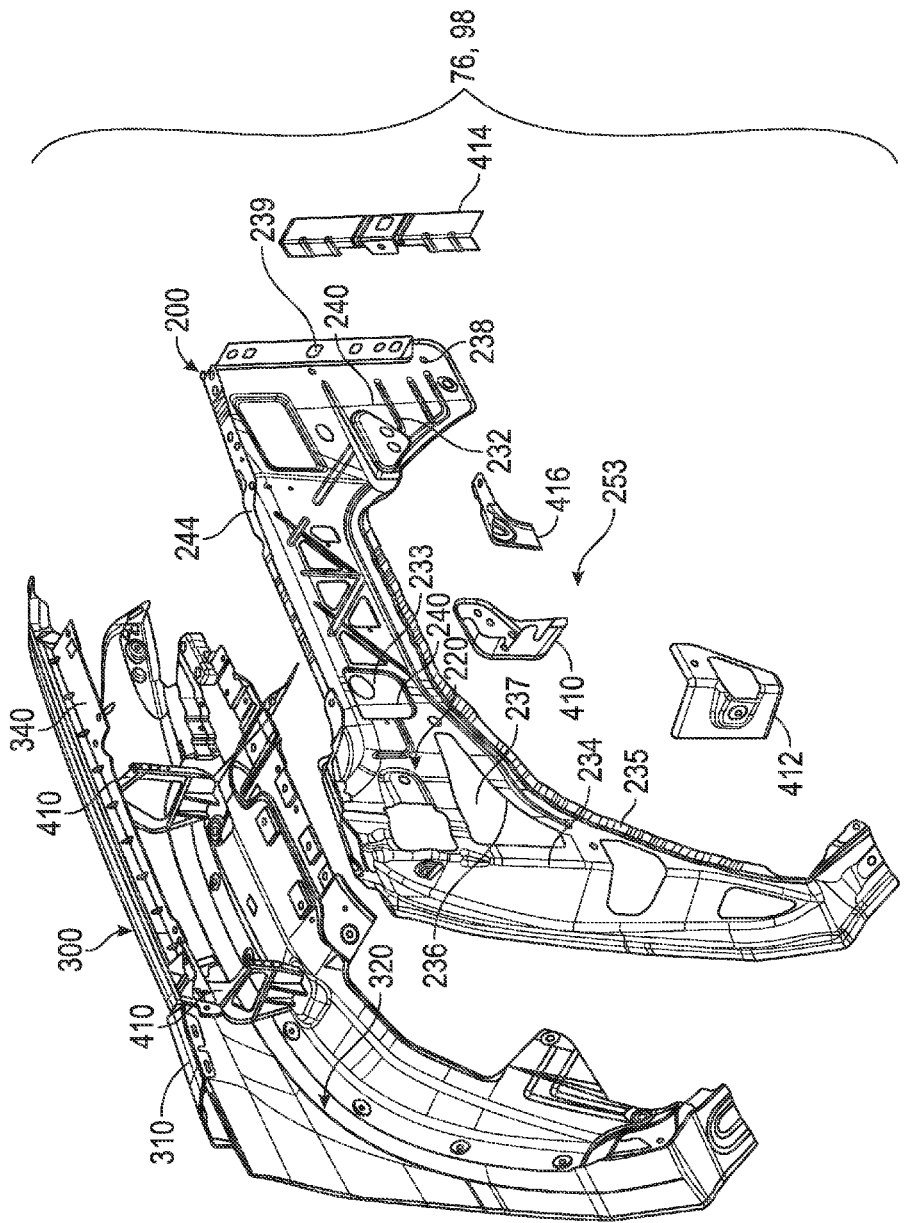
FIG. 8 is a rear perspective view of the inner surface of the inner fender panel of FIG. 6 and a disassembled rear perspective view of an embodiment of a structural fender assembly (e.g., driver side) incorporating the same, including a rear perspective view of the inner surface of an embodiment of an outer fender panel.
Figure 9:
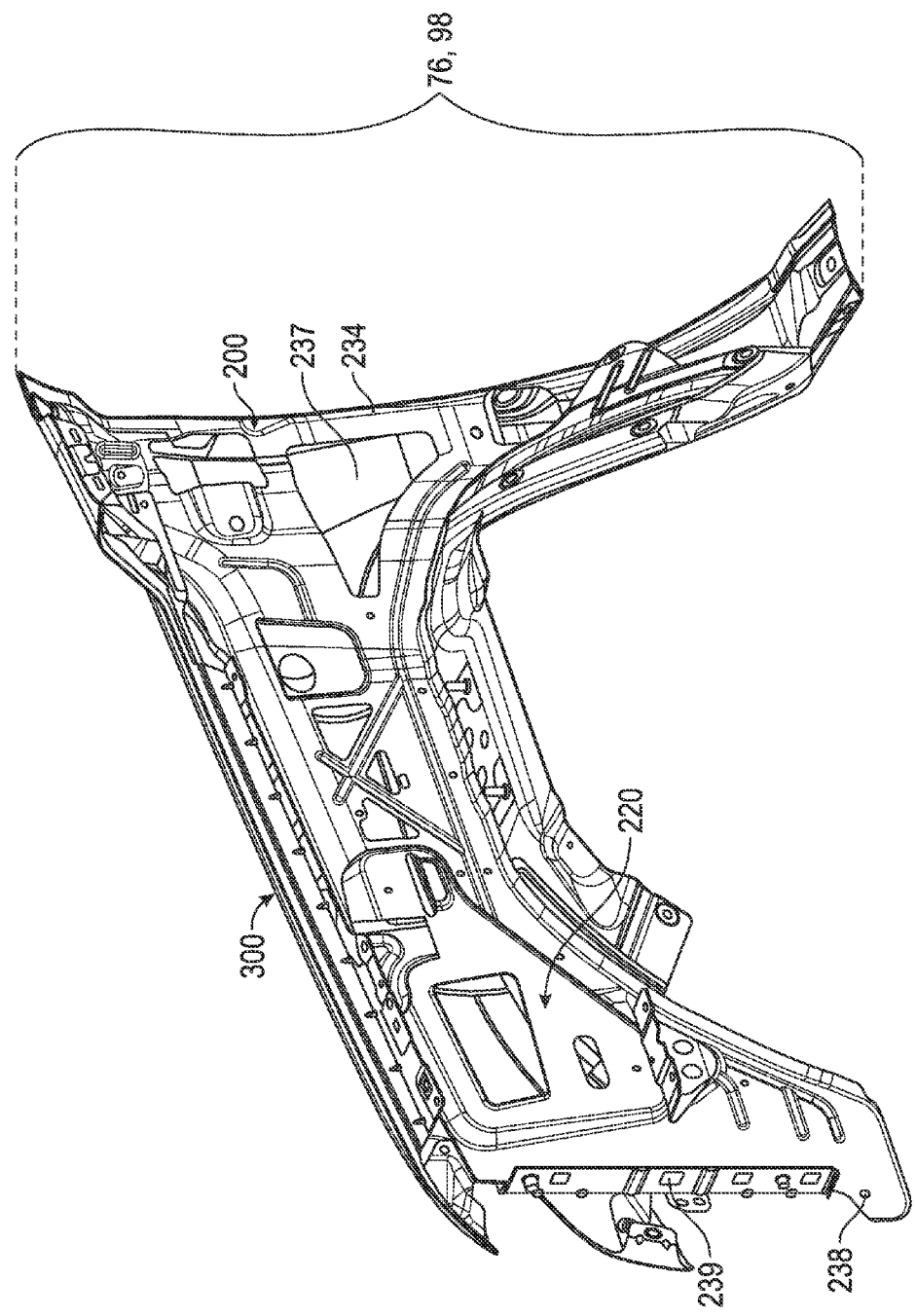
FIG. 9 is an assembled front perspective view of a structural fender assembly (e.g., passenger side)
Figure 10:
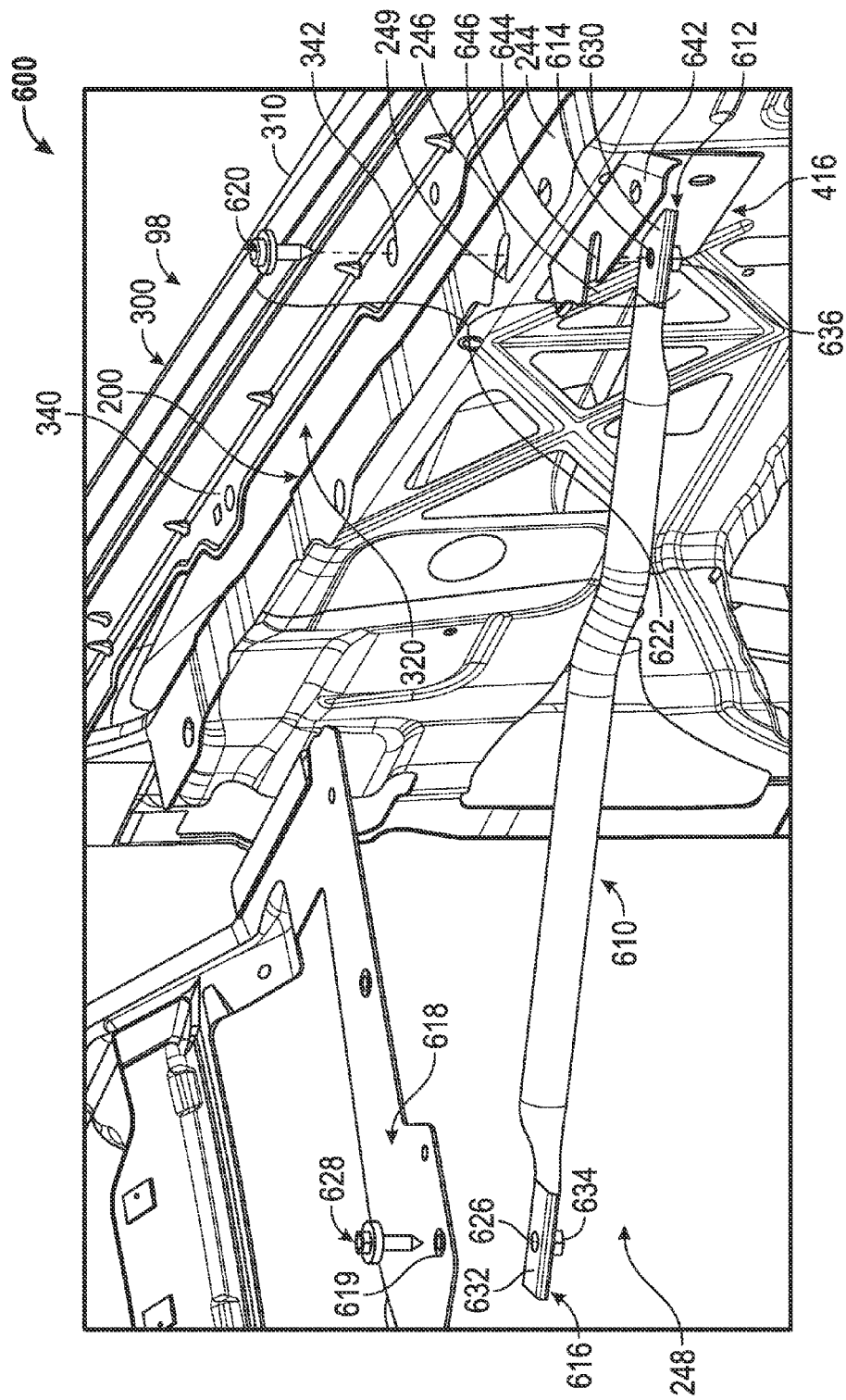
FIG. 10 is a partially disassembled perspective view of an exemplary embodiment of a selectively detachable fender brace system as disclosed herein.
Figure 11:
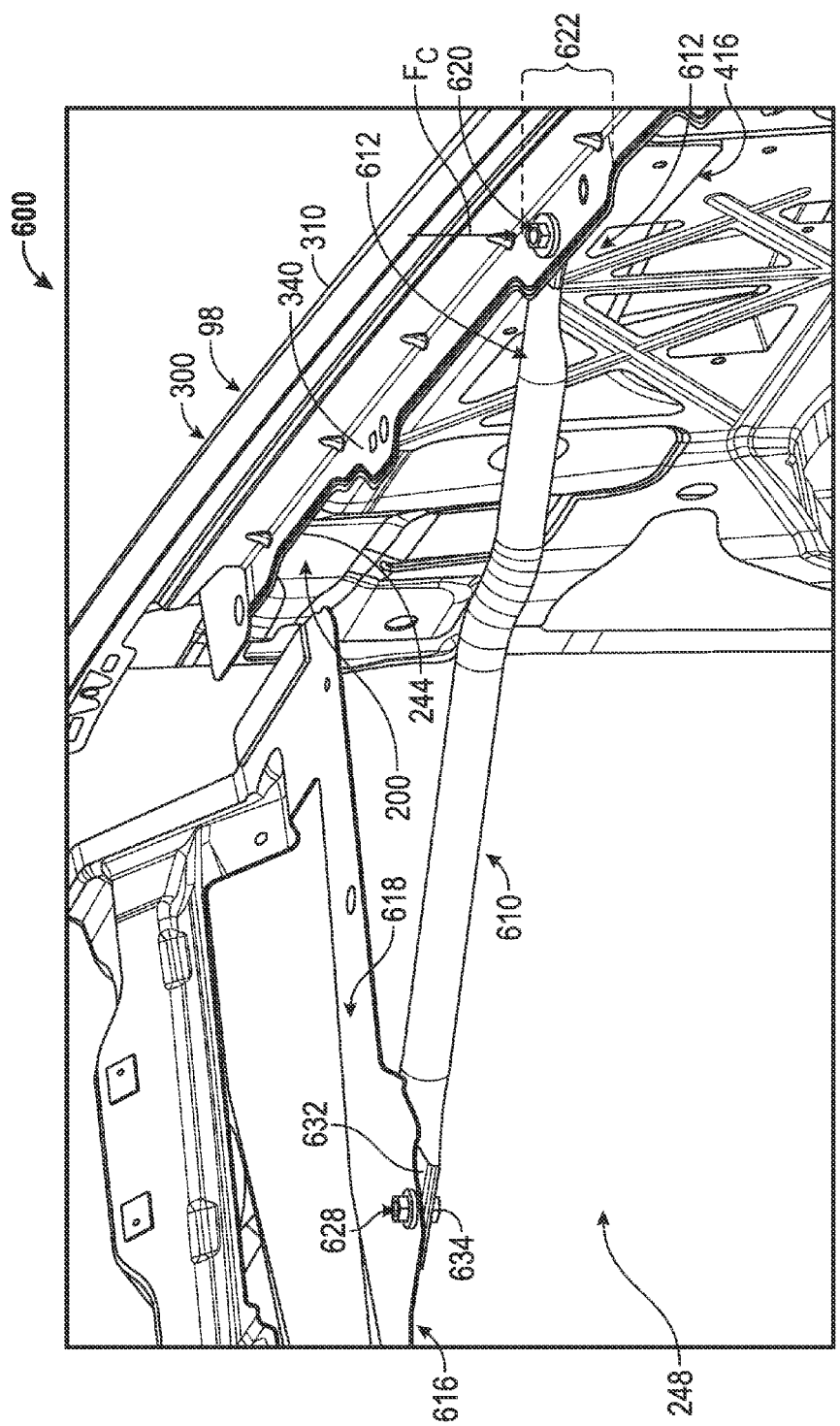
FIG. 11 is a perspective view of the assembled selectively detachable fender brace system of FIG. 10.

In one embodiment, the plurality of abutting inner fender panel sections 230 of an inner fender panel 200 for a structural fender assembly 76, 98 include a door attachment section 250 that abuts a central section 252 that in turn abuts a front attachment section 254. The door attachment section located axially rearward of the other sections on the vehicle and is positioned proximate the front door structure and configured for attachment to the front door structure, such as the front door frame (not shown). The door attachment section 250 may be formed as a one-piece door attachment section (FIG. 6). Alternately, the door attachment section 250 may be formed as a two-piece door attachment section that includes an upper door attachment member (not shown) and a lower door attachment member (not shown). The door attachment section 250 defines a portion of the wheel cutout 253 as does the front attachment section 254. In one example, the central section 252 has a thickness that is less than the door attachment section and the front attachment section. This is because in one embodiment the stress/load-bearing requirements for the central section 252 are lower than the adjacent sections. Thus, the size, shape, location and lesser thickness of the central section 252 may be selected to accommodate the lower stresses and loads. Similarly, the size, shape, location and greater thicknesses of the door attachment section 250 and front attachment section 254 may be selected to accommodate the larger stresses and loads.

In one embodiment, a structural fender or structural fender assembly 76, 98 for an automotive vehicle 12 includes the formed outer fender panel 300 having a viewable outer surface 310 and an inner surface 320. The structural fender assembly 76, 98 also includes the formed inner fender panel 200 having an outer surface 210 configured for attachment to the inner surface 320 of the outer fender panel 300 and an inner surface 220, where the inner fender panel 200 includes a plurality of abutting inner fender panel sections 230 that are joined to one another, with each inner fender panel section 230 having a thickness, and at least two abutting inner fender panel sections 230 having thicknesses that are different. The outer fender panel 300 and inner fender panel 200 may be attached to one another by any suitable attachments or attachment methods, including by a plurality of weld joints, such as a plurality of spot weld joints. The attachment of the outer fender panel 300 and inner fender panel 200 forms a structural fender assembly 76, 98 that provides the necessary vehicle structure to surround and enclose the associated members of the vehicle frame and front corner, including the various members of the braking assembly and wheel assembly as are known in the art, without the need for an attachment to a separate frame for the front clip. The structural fender assembly 76, 98 may also include additional braces 410 or struts, FIG. 8, that may be used to reinforce or strengthen portions of the assembly, as well as various brackets or braces, such as door attachment bracket, 412, positioning and reinforcement attachment bracket 414 and radiator support bracket 416 that may be used to attach and/or reinforce the structural fender assembly 76, 98 to other concomitant portions of the vehicle 12 structure.

As shown, for example, in FIGS. 1-5, in one embodiment, a first front fender assembly 76, 98 is operably attached to a first end 174 of a cross-vehicle extending positioning and reinforcement structure 30 having the first end 174, such as first side flange 74. A second front fender assembly 98 that comprises a substantially mirror image of the first front fender assembly 76 about the central axis 25 is attached to a second end 196 of the positioning and reinforcement structure 30, wherein the positioning and reinforcement structure is operable to fix a predetermined position of the first fender assembly 76 and the second fender assembly 98 in relation to a hood 118 of the vehicle 12.

Referring to FIGS. 1-14, and more particularly to FIGS. 10-13, in one exemplary embodiment, a selectively detachable fender brace system 600 is disclosed. The system 600 includes a structural fender assembly 76, 98 comprising an inner fender panel 200 and an outer fender panel 300. The outer fender panel 300 comprises an outer surface 310 that comprises a viewable surface of the vehicle 12. The outer fender panel 300 has an outer upper attachment flange 340 extending fore and aft along the panel. The outer upper attachment flange 340 has a brace bore 342 disposed therein. The inner fender panel 200 has an inner upper attachment flange 244 running fore and aft along the panel; the inner upper attachment flange 244 having a first blind slot 246, FIG. 10. The first blind slot 246 extends rearward to a first slot opening 249. The inner fender panel 200 is attached to the outer fender panel 300 as described herein with the inner upper attachment flange 244 disposed below the outer upper attachment flange 340 and a brace bore 342 in the upper attachment flange disposed proximate the first blind slot 246. The system 600 also includes a brace 610 comprising a fender end 612 having a fender bore 614 extending therethrough and an opposed wall end 616 that is detachably attached to a cross-vehicle wall 618 of an engine compartment 248. The system 600 further includes a threaded fastener 620 that is disposed through the brace bore 342, first blind slot 246 and fender bore 614 and configured to apply a predetermined clamping force ($F_C$) to them forming a selectively detachable fender attachment joint 622, FIG. 11. The wall end 616 of the brace 610 has a wall bore 626 extending therethrough and is detachably attached to the cross-vehicle wall 618 by inserting a threaded wall fastener 628 through brace bore 619.

Figure 13:
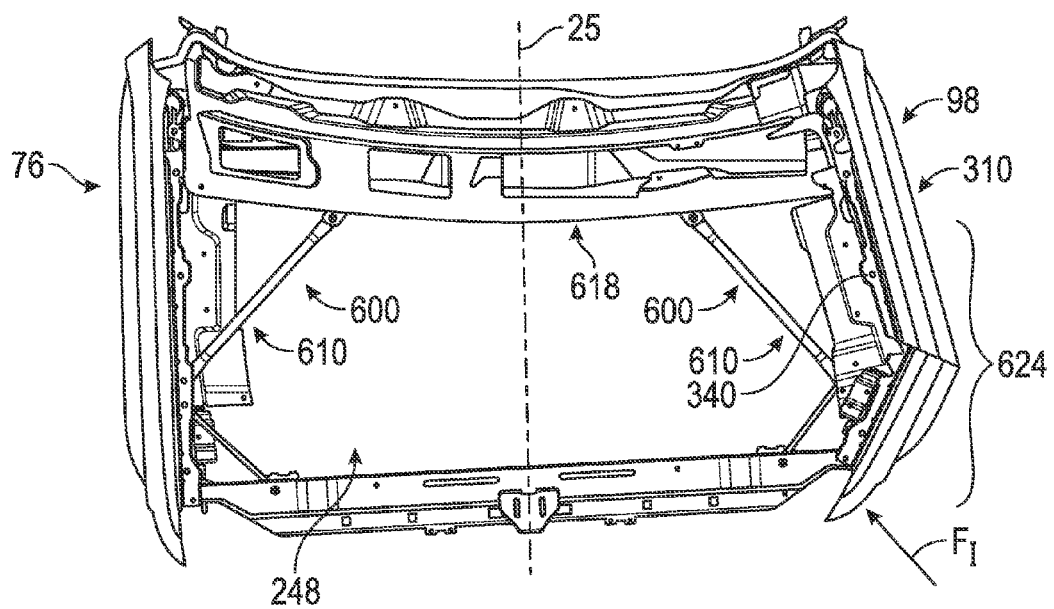
FIG. 13 is a top view of the embodiment of FIG. 12 in a frontal impact operating condition.

The selectively detachable fender attachment joint 622 may be selectively detached by relative movement of at least one of the threaded fastener 620 and first blind slot 246 to release the fastener 620 from the first slot opening 249 by application of a predetermined force ($F_I$), FIG. 13, on a front portion of the structural fender assembly. For purposes of illustration, the predetermined impact force ($F_I$) is shown being applied to the left side (as viewed by a driver) fender assembly 98; however, it will be readily understood that this force may be applied to the right side fender assembly 76, or to both assemblies, as equally or non-equally distributed impact forces. This relative movement also involves the threaded fastener 620 tearing out or through the material surrounding the brace bore 342 from the outer upper attachment flange 340 so that the brace 610 is detached from the respective fender assembly 76, 98. The release of the threaded fastener 620 from the first slot opening enables the fender assembly 76, 98 to deform outwardly away from the engine compartment. The initial restraint of the fender assembly 98 by the brace 610 at the location of the selectively detachable fender attachment joint 622 will cause the controlled deformation 624 of the fender assembly 98 outwardly away from the engine compartment 248 proximate the selectively detachable fender attachment joint 622.

The brace 610 may have any suitable brace form comprise any suitable brace material and be formed by any suitable brace manufacturing or fabrication method. The brace 610 comprises a rigid member that strengthens and stiffens the fender assembly 76, 98 to which it is attached. In one embodiment, the brace 610 comprises a hollow metal tube and the fender end 612 and the wall end 616 comprise respective flattened ends 630, 632 of the hollow metal tube. The brace 610 may be attached using any suitable fastener or fastening mechanism. In one embodiment, a first threaded nut 636 is attached to a lower surface of the flattened wall end 630 away from the inner fender panel 300 and a second threaded nut 634 is attached to a lower surface of the flattened end 632 away from the cross-vehicle wall 618. The threaded fastener 620 is tightened into the threaded nut 636 to establish a predetermined clamping force ($F_C$) as described herein. The threaded wall fastener 628 is inserted through the brace bore 626 and wall bore 619 and tightened into the first threaded nut 634 to detachably attach the wall end 616 of the brace 610 to the cross-vehicle wall. The brace 610 may be formed out of any suitable material, including various metals, and particularly various grades of steel or steel alloys, as well as various aluminum alloys, employed in making tubular articles.

In one embodiment, the selectively detachable fender brace system 600 also includes a brace bracket 416 attached to the inner fender panel 200. The brace bracket 416 also includes a fender flange 642 that abuts the inner upper attachment flange 244 of the inner fender panel 200. The fender flange 642 includes a second blind slot 644 that extends rearward to a second slot opening 646, wherein the threaded fastener 620 is disposed through the brace bore 342, first blind slot 246, second blind slot 644 and fender bore 614 and is configured to apply the predetermined clamping force ($F_C$) to them forming the selectively detachable fender attachment joint 622. The brace bracket 416 is used to locally strengthen and stiffen the fender assembly 76, 98 proximate the brace 610. The brace bracket 416 may be formed out of any suitable material, including various metals, and particularly various grades of steel or steel alloys, as well as various aluminum alloys, employed in metal stamping.

Figure 12:
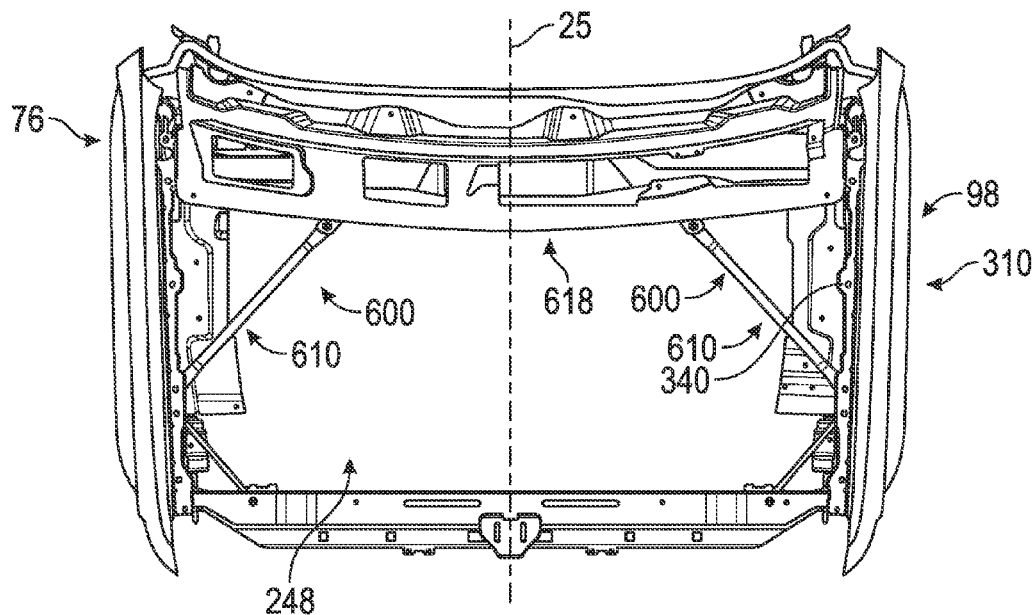
FIG. 12 is a top view of an embodiment of a vehicle having a selectively detachable fender brace system as disclosed herein in a normal operating condition.

Referring to FIGS. 12 and 13, a vehicle 12 that includes a selectively detachable fender brace system 600 is disclosed. The vehicle 12 includes two braces 610 attached to fender assemblies 76, 98, which may be the substantially the same and represent as mirror images of one another, or different from one another, using selectively detachable fender attachment joint 622, FIGS. 9-10. FIG. 12 illustrates the vehicle under normal operating conditions where the brace 610 is attached using the selectively detachable fender attachment joint 622. FIG. 13 illustrates the vehicle under a frontal impact condition where an impact force ($F_I$) has been applied to the frontal portion of the fender assembly 98 and the selectively detachable fender attachment joint 622 has become detached, thereby releasing the fender assembly 98 to deform outwardly away from the engine compartment 248 as described herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A selectively detachable fender brace system, comprising:
   a structural fender assembly comprising an inner fender panel and an outer fender panel comprising an outer surface that is a viewable surface of a vehicle, the outer fender panel having an outer upper attachment flange, the outer upper attachment flange having a brace bore disposed therein, the inner fender panel having an inner upper attachment flange, the inner upper attachment flange having a first blind slot, the first blind slot extending rearwardly to a first slot opening, the inner fender panel attached to the outer fender panel with the inner upper attachment flange disposed below the outer upper attachment flange and the brace bore disposed proximate the first blind slot;
   a brace comprising a fender end having a fender bore extending therethrough and an opposed wall end that is detachably attached to a cross-vehicle wall of an engine compartment; and
   a fastener that is disposed through the brace bore, first blind slot and fender bore and configured to apply a predetermined clamping force to them forming a selectively detachable fender attachment joint.

2. The selectively detachable fender brace system of claim 1, wherein the selectively detachable fender attachment joint may be selectively detached by relative movement of at least one of the fastener and first blind slot to release the fastener from the first slot opening by application of a predetermined impact force on a front portion of the structural fender assembly.

3. The selectively detachable fender brace system of claim 1, wherein release of the fastener from the first slot opening enables the fender assembly to deform outwardly away from the engine compartment.

4. The selectively detachable fender brace system of claim 1, wherein the wall end of the brace has a wall bore extending therethrough and is detachably attached to the cross-vehicle wall by a wall fastener.

5. The selectively detachable fender brace system of claim 1, wherein the brace comprises a hollow metal tube, the fender end and the wall end comprising respective flattened ends of the tube.

6. The selectively detachable fender brace system of claim 5, wherein a first threaded nut is attached to a surface of the flattened wall end away from the inner fender panel and a second threaded nut is attached to a surface of the flattened fender end away from the cross-vehicle wall, and wherein the fastener and wall fastener comprise threaded fasteners.

7. The selectively detachable fender brace system of claim 1, further comprising a brace bracket attached to the inner fender panel, the brace bracket comprising a fender flange that abuts the inner upper attachment flange of the inner fender panel, the fender flange having a second blind slot that extends rearwardly to a second slot opening, wherein the fastener is disposed through the brace bore, first blind slot, second blind slot and fender bore and configured to apply a predetermined clamping force to them forming the selectively detachable fender attachment joint.

8. The selectively detachable fender brace system of claim 7, wherein the wall end of the brace has a wall bore extending therethrough and is detachably attached to the cross-vehicle wall by a wall fastener.

9. The selectively detachable fender brace system of claim 7, wherein the brace comprises a hollow metal tube, the fender end and the wall end comprising respective flattened ends of the tube.

10. The selectively detachable fender brace system of claim 9, wherein a first threaded nut is attached to a surface of the flattened wall end away from the inner fender panel and a second threaded nut is attached to a surface of the flattened fender end away from the cross-vehicle wall, and wherein the fastener and wall fastener comprise threaded fasteners.

11. A vehicle comprising a selectively detachable fender brace system, comprising:
   a structural fender assembly comprising an inner fender panel and an outer fender panel comprising an outer surface that is a viewable surface of the vehicle, the outer fender panel having an outer upper attachment flange, the outer upper attachment flange having a brace bore disposed therein, the inner fender panel having an inner upper attachment flange, the inner upper attachment flange having a first blind slot, the first blind slot extending rearwardly to a first slot opening, the inner fender panel attached to the outer fender panel with the inner upper attachment flange disposed below the outer upper attachment flange and the brace disposed proximate the first blind slot;
   a brace comprising a fender end having a fender bore extending therethrough and an opposed wall end that is detachably attached to a cross-vehicle wall of an engine compartment;
   a fastener that is disposed through the brace bore, first blind brace slot and fender bore and configured to apply a predetermined clamping force to them forming a selectively detachable fender attachment joint;
   a second structural fender assembly disposed opposite the engine compartment from the first fender assembly, the second structural fender assembly comprising a second inner fender panel and a second outer fender panel comprising a second outer surface that is a second viewable surface of the vehicle, the second outer fender panel having a second outer upper attachment flange, the second outer upper attachment flange having a second brace bore disposed therein, the second inner fender panel having a second inner upper attachment flange, the second inner upper attachment flange having a second blind slot, the second blind slot extending rearwardly to a second slot opening, the second inner fender panel attached to the second outer fender panel with the second inner upper attachment flange disposed below the second outer upper attachment flange and the second brace bore disposed proximate the second blind slot;

a second brace comprising a second fender end having a second fender bore extending therethrough and an opposed second wall end that is detachably attached to the cross-vehicle wall of the engine compartment; and a second fastener that is disposed through the second brace bore, second blind slot and second fender bore and configured to apply a predetermined second clamping force to them forming a selectively detachable second fender attachment joint.

12. The vehicle of claim 11, wherein at least one of the selectively detachable fender attachment joint or the second fender attachment joint may be selectively detached by relative movement of at least one of the fastener and first blind slot or second fastener and second blind slot to release the fastener from the first slot opening or the second fastener from the second slot opening, respectively, by application of a predetermined impact force on a front portion of the structural fender assembly or a second front portion of the second structural fender assembly, respectively.

13. The selectively detachable fender brace system of claim 12, wherein release of the fastener from the first slot opening enables the fender assembly to deform outwardly away from an engine compartment and release of the second fastener from the second slot opening enables the second fender assembly to deform outwardly away from the engine compartment.

14. The selectively detachable fender brace system of claim 11, wherein the wall end of the brace has a wall bore extending therethrough and is detachably attached to the cross-vehicle wall by a wall fastener and the second wall end of the second brace has a second wall bore extending therethrough and is detachably attached to the cross-vehicle wall by a second wall fastener.

15. The selectively detachable fender brace system of claim 14, wherein the brace comprises a hollow metal tube, the fender end and the wall end comprising respective flattened ends of the tube and the second brace comprises a second hollow metal tube, the second fender end and the second wall end comprising respective second flattened ends of the second tube.

16. The selectively detachable fender brace system of claim 15, wherein a first threaded nut is attached to a surface of the flattened wall end away from the inner fender panel and a second threaded nut is attached to a surface of the flattened fender end away from the cross-vehicle wall and a third threaded nut is attached to a second surface of the flattened second wall end away from the second inner fender panel and a fourth threaded nut is attached to a surface of the flattened second fender end away from the cross-vehicle wall, and wherein the fastener, second fastener, wall fastener and second wall fastener comprise threaded fasteners.

17. The selectively detachable fender brace system of claim 11, further comprising: a brace bracket attached to the inner fender panel, the brace bracket comprising a fender flange that abuts the inner upper attachment flange of the inner fender panel, the fender flange having a third blind slot that extends rearwardly to a third slot opening, wherein the fastener is disposed through the brace bore, first blind slot, third blind slot and fender bore and is configured to apply a predetermined clamping force to them forming the selectively detachable fender attachment joint; and a second brace bracket attached to the second inner fender panel, the second brace bracket comprising a second fender flange that abuts the second inner upper attachment flange of the second inner fender panel, the second fender flange having a fourth blind slot that extends rearwardly to a fourth slot opening, wherein the fastener is disposed through the brace bore, second blind slot, fourth blind slot and fender bore and is configured to apply a predetermined clamping force to them forming the selectively detachable fender attachment joint.

18. The selectively detachable fender brace system of claim 17, wherein the wall end of the brace has a wall bore extending therethrough and is detachably attached to the cross-vehicle wall by a wall fastener and the second wall end of the second brace has a second wall bore extending therethrough and is detachably attached to the cross-vehicle wall by a second wall fastener.

19. The selectively detachable fender brace system of claim 18, wherein the brace comprises a hollow metal tube, the fender end and the wall end comprising respective flattened ends of the tube and the second brace comprises a second hollow metal tube, the second fender end and the second wall end comprising respective second flattened ends of the second tube.

20. The selectively detachable fender brace system of claim 19, wherein a first threaded nut is attached to a surface of the flattened wall end away from the inner fender panel and a second threaded nut is attached to a surface of the flattened fender end away from the cross-vehicle wall and a third threaded nut is attached to a surface of the flattened second wall end away from the second inner fender panel and a fourth threaded nut is attached to a surface of the flattened second fender end away from the cross-vehicle wall, and wherein the fastener, second fastener, wall fastener and second wall fastener comprise threaded fasteners.

* * * * *